US008737835B2

(12) United States Patent
Zami (10) Patent No.: US 8,737,835 B2
(45) Date of Patent: May 27, 2014

(54) OPTICAL PACKET SWITCHING DEVICE

(75) Inventor: Thierry Zami, Nozay (FR)

(73) Assignee: Alcatel Lucent, Paris (FR)

( * ) Notice: Subject to any disclaimer, the term of this patent is extended or adjusted under 35 U.S.C. 154(b) by 140 days.

(21) Appl. No.: 13/497,216

(22) PCT Filed: Sep. 15, 2010

(86) PCT No.: PCT/FR2010/051917
§ 371 (c)(1),
(2), (4) Date: Apr. 9, 2012

(87) PCT Pub. No.: WO2011/039443
PCT Pub. Date: Apr. 7, 2011

(65) Prior Publication Data
US 2012/0183293 A1    Jul. 19, 2012

(30) Foreign Application Priority Data

Sep. 29, 2009 (FR) ...................................... 09 56727

(51) Int. Cl.
*H04J 14/00* (2006.01)
*H04J 14/02* (2006.01)
(52) U.S. Cl.
USPC ................................. 398/45; 398/82; 398/83
(58) Field of Classification Search
USPC .............................. 398/45, 48–52, 82, 83, 85
See application file for complete search history.

(56) References Cited

U.S. PATENT DOCUMENTS

| 7,805,049 | B2 * | 9/2010 | Handelman | 385/147 |
| 8,111,990 | B2 * | 2/2012 | Rhee et al. | 398/45 |
| 8,170,416 | B2 * | 5/2012 | Kai et al. | 398/45 |
| 8,274,733 | B2 * | 9/2012 | Noguchi | 359/344 |
| 2007/0025731 | A1 | 2/2007 | Schofield | |
| 2009/0238574 | A1 * | 9/2009 | Sone | 398/139 |
| 2012/0033968 | A1 * | 2/2012 | Testa et al. | 398/47 |

FOREIGN PATENT DOCUMENTS

| EP | 0924950 | 6/1999 |
| EP | 1241913 | 9/2002 |
| EP | 1408715 | 4/2004 |
| EP | 1986361 | 10/2008 |

OTHER PUBLICATIONS

Chiaroni, D.; Optical Packet Add/Drop Multiplexers for Packet Ring Networks; ECOC2008, ECOC, Brussels, Sep. 21-25, 2008; ECOC, Brussels Expo, Belgium; pp. 103-106; XP001524738; ISBN: 978-1-4244-2228-9.

(Continued)

*Primary Examiner* — Dalzid Singh
(74) *Attorney, Agent, or Firm* — Carmen Patti Law Group, LLC (57) ABSTRACT

An optical packet switching device (20) comprises an input section (9) able to receive an optical signal comprising data packets (60) carried by wavelength channels, a transit section (30) comprising optical paths (31) to ensure the transparent transit of the respective wavelength channels, several selector elements (34) which can be switched in packet mode to selectively block or allow an individual data packet to pass through, and a control unit able to receive signalling information about the data packets received in the input section and to control a selector element corresponding to the wavelength channel to block or allow said data packets to pass, said control unit maintaining the selector element (34) in a blocking state during the time windows in which no data packets are received on said wavelength channel.

11 Claims, 4 Drawing Sheets

(56) References Cited

OTHER PUBLICATIONS

Chiaroni, D. et al; Successful Demonstration of the Compatibility of Optical Packet and Wavelength Circuit Switching in Optical Networks; Optical Communication; 2009, ECOC '09; 35th European Conference on, IEEE, Piscataway, NJ; USA; Sep. 20, 2009; pp. 1-2; XP031546500; ISBN: 978-1-4244-5096-1.

Takashi, Sakamoto et al; Optical Packet Synchronizer Using Wavelength and Space Switching; IEEE Photonics Technology Letters, IEEE Service Center, Piscataway, NJ, US; vol. 14, No. 9; Sep. 1, 2002; XP011067316; ISSN: 1041-1135.

Wen-Ping Chen et al; A Novel Burst Algorithm of OBS Metro Ring Networks; COIN-NGNCON 2006; The Joint International Conference on Optical Internet and Next Generation Network, Jul. 9-13, 2006, Jeju, South Korea, IEEE, Piscataway, NJ, USA; Jul. 9, 2006; pp. 121-123; XP031232265; ISBN: 978-89-955301-4-6.

\* cited by examiner

FIG_1

FIG_4

FIG_2

FIG_3

FIG_5

FIG_6

FIG_7

OPTICAL PACKET SWITCHING DEVICE

BACKGROUND

The invention pertains to optical communication networks with spectral multiplexing (WDM). The invention also pertains to an optical packet switching device, and, more generally, to the network components for such a communication network.

We know of optical packet add-drop multiplexers for optical communication networks with spectral multiplexing, for example according to US 2002/0131118. The fundamental functions of such a device are the insertion of traffic, the extraction of traffic, the transmission of traffic, and the extraction-transmission of multipoint traffic. By completing the transmission function transparently, which is to say without converting the data signal to the electronic domain, the number of optical transponders necessary is reduced in relation to a communication node producing an electronic conversion of all incoming traffic.

SUMMARY

In one form, the invention discloses an optical packet switching device comprising: An input section able to receive an optical signal comprising data packets carried by wavelength channels, An output section able to transmit an optical signal comprising data packets carried by wavelength channels, An extraction section able to demodulate data packets carried by at least one of the wavelength channels received in the input section, An insertion section able to generate optical data packets on at least one wavelength channel to be transmitted by the output section, A spectral separator to separate several of said wavelength channels received by the input section, An optical combiner to recombine the wavelength channels separated by said spectral separator, A transit section comprising optical paths to transparently transit the respective wavelength channels between the spectral separator and the optical combiner, Several selector elements each cooperating with a respective optical path and able to be switched in packet mode to selectively block or open access for a specific data packet carried by the wavelength channel using said optical path, and A control unit able to receive signalling information about the data packets received in the input section and to define, for a data packet, a wavelength channel and a time window that contains said data packet, and to control a selector element corresponding to said wavelength channel synchronously with said time window to block or allow said data packet to pass, said control unit maintaining the selector element in a blocking state during the time windows in which no data packets are received on said wavelength channel.

In other advantageous forms, this device may comprise one or more of the following characteristics:

The signalling information related to a data packet defines a destination for said data packet.

The control unit is capable of switching the selector element to a pass-through state during a time window containing a data packet with a destination downstream of said communication node to allow the data packet to pass on to said output section.

The insertion section comprises at least one optical transmitter able to generate data packets on said wavelength channel.

The control unit is capable of receiving information about the data awaiting insertion and of controlling said optical transmitter for the insertion section to generate, on said wavelength channel, optical packets containing said data awaiting insertion synchronously with the time windows in which the selector element is in the blocking state.

The selector element may be positioned on the optical path or at one of its ends, in particular in the spectral separator or the optical combiner.

'Spectral separator' designates one or more components, positioned on one or more levels, making it possible to separate optical signals into several wavelengths. The spectral separator may include a component adapted to a predetermined wavelength grid, such as a demultiplexer or a non-coloured beam splitter associated with fixed or tunable filters. The spectral separator may be reconfigurable, for example, in the form of a wavelength selector switch (WSS). A spectral separator may be designed to separate individual channels or groups of channels, especially spectral bands containing one or more channels. Similarly, an optical path and a corresponding selector element may be dedicated to the transit of one individual wavelength channel or the transit of a group of channels.

The insertion section may comprise one or more fixed- or adjustable-wavelength optical transmitters. The number of transmitters determines the insertion capacity of the node. Preferably, the insertion section is designed to be modular to enable the adaptation of the insertion capacity of the node to actual needs.

Preferably, the insertion section comprises a fast tunable optical transmitter. 'Fast tuning' designates the capacity of an optical source to change the transmission wavelength much more quickly than the average duration of the optical packets. Such a source may for example be used to transmit successive packets on distinct wavelengths.

The insertion section may be connected to the inside or outside of the transit section. In the first case, the insertion section comprises one or more fixed or tunable transmitters linked to one or more optical paths upstream from the optical combiner or to the ports of the optical combiner. In the second case, the insertion section comprises one or more fixed or tunable transmitters linked to the output section.

'Optical combiner' designates one or more components, positioned on one or more levels, making it possible to combine optical signals of several wavelengths. The optical combiner may include a component adapted to a predetermined wavelength grid, such as a multiplexer or a non-coloured component, such as a star coupler. A non-coloured component may be preferred if the optical combiner must receive the inserted traffic, as it does not limit the choice of wavelengths for traffic insertion.

The extraction section may comprise one or more fixed- or adjustable-wavelength optical receivers. The number of receivers determines the extraction capacity of the node. Preferably, the extraction section is designed to be modular to enable the adaptation of the extraction capacity of the node to actual needs.

According to one specific form, the extraction device comprises several packet mode receivers, each linked to an optical path in the transit section and able to demodulate data packets carried by the wavelength channels passing through the corresponding optical paths. This layout makes it possible to extract packets carried by several wavelength channels, which offers flexibility for the sources that must send traffic to the node.

According to another specific form, the extraction section comprises at least one packet mode receiver connected to the input section through the intermediary of at least one fast tunable filter to select a wavelength channel carrying a data packet that must be demodulated.

The extraction section may be connected to the inside or outside of the transit section. In the first case, the extraction section comprises one or more fixed or tunable receivers linked to one or more optical paths in the transit section. In the second case, the extraction section comprises one or more fixed or tunable receivers linked to the input section upstream of the spectral separator.

Advantageously, the extraction section comprises several packet mode receivers to demodulate the data packets carried by several wavelength channels received in the input section and an electronic switch to transfer the data from said packets to several outputs destined for the extracted traffic. This layout makes it possible to simultaneously extract packets from several channels and to resolve competition among the data extracted to the output ports.

Preferably, said or each selector element comprises a semiconductor optical amplifier laid out as an optical port on an optical path in the transit section. This form makes it possible to use the amplifier to erase packets that should not be transmitted and to re-amplify packets that should be transmitted to the output section of the node. There are other possibilities for creating the selector element, for example a 1×2 or 2×2, or other type of switch.

The information about the wavelength channel carrying a packet can be explicit, for example when the signalling includes digital information identifying the channel, or implicit, for example when a given physical channel carries the signalling information about a given wavelength channel.

The information about the time window containing a packet may be explicit, for example when the signalling includes digital information identifying the start, end, and/or duration of the time window, or implicit, for example when the signalling information received by the control unit and the data packets received by the optical layer of the node are synchronised in a predefined manner. The data packets may be variable- or fixed-size packets. Preferably, the data packets are positioned roughly synchronously on the various wavelength channels.

Advantageously, the signalling information about the data packets received in the input section is carried by a predetermined wavelength channel of said optical signal, said node comprising a spectral separator to separate said predetermined channel and an optical receiver to demodulate said signalling information. The signalling may be carried off of the band, which is to say on one or more channels reserved for signalling, or in the band, which is to say on one or more channels shared with data packets, in particular in packet headers.

According to one form, the invention also provides a communication node for a WDM optical network comprising:
Several input lines to receive the incoming WDM optical signals,
several output lines to transmit the outgoing WDM optical signals,
A switching device mentioned above interposed on each of said input or output lines, and
A wavelength switching device linking said input lines with said output lines and capable of forming said outgoing WDM optical signals and recombining the wavelength channels coming from said incoming WDM optical signals each time.

According to one form, the invention also provides a transparent or hybrid optical network comprising several network components selected from the group consisting of the switching devices mentioned above and the communication nodes mentioned above, and optical fibres linking said network components.

This optical network may be used, in particular, to transmit data packets with various modulation formats and/or various modulation rates.

One idea at the basis of the invention is to make it possible for several optical packets transmitted by several different sources to share a single wavelength channel in a WDM optical network. The selector element that can be switched into packet mode makes it possible to selectively erase a packet in the transit section to release the wavelength channel to add a packet on the same channel by the insertion section of the node or by another network component. This selective erasing of packets on a wavelength channel may serve to delete traffic without a destination downstream of the communication node-such as point-to-point traffic that must be extracted by the extraction section of the node—or to delete a packet in transit in favour of a packet to be added by the insertion section—such as when there is no bandwidth available for the packet to be added and this packet has a priority level greater than or equal to the packet in transit.

Moreover, control of the selector element, maintained by default in a blocking state, in each network component makes it possible to keep optical noise to a very low level in unoccupied time windows. Therefore, inserting an optical packet into a previously unoccupied window is carried out over low background noise, which optimises the optical signal to noise ratio (OSNR) and thus makes it possible to improve the transmission distance in the optical field.

DESCRIPTION OF THE DRAWINGS

The invention will be better understood, and other purposes, details, characteristics, and advantages thereof will become more clearly apparent, upon examining the following description of multiple particular forms of the invention, which are given only by way of illustrative and non-limiting examples and make reference to the attached drawings. In these drawings.

DETAILED DESCRIOTION

Figure 1:
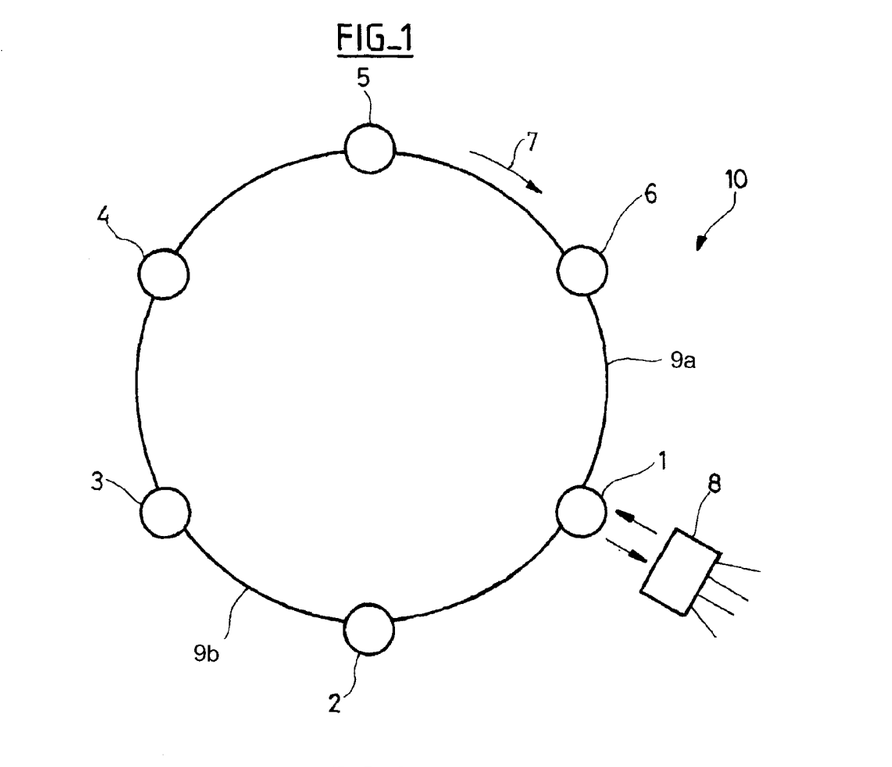
FIG. 1 is a schematic view of an optical network according to one form of the invention.

FIG. 1 very schematically depicts an optical network 10 with a ring architecture—for example, of a metropolitan type—comprising access nodes 1, 2, 3, 4, 5, and 6 interconnected by optical links 9—for example, optical fibres. Arrow 7 shows the circulation direction of the optical signals in the ring. The data are transported on a grid of N predetermined wavelength channels, N being a positive whole number, for example equal to 40 or 80 channels. The flow of data per wavelength channel is set by the rate of the optical modulators in the access nodes, for example 10 or 40 Gbit/s. Each access node cooperates with a client layer, depicted at number 8 for node 1, which provides the access node with data to insert into the optical network and which recovers data extracted from the optical network by the access node. This client layer includes, for example, an aggregation network or a passive optical network. Many elements other than those depicted may be involved in the construction of the network 10, for example redundant links to protect against breakdowns, a network management system, etc.

Figure 2:
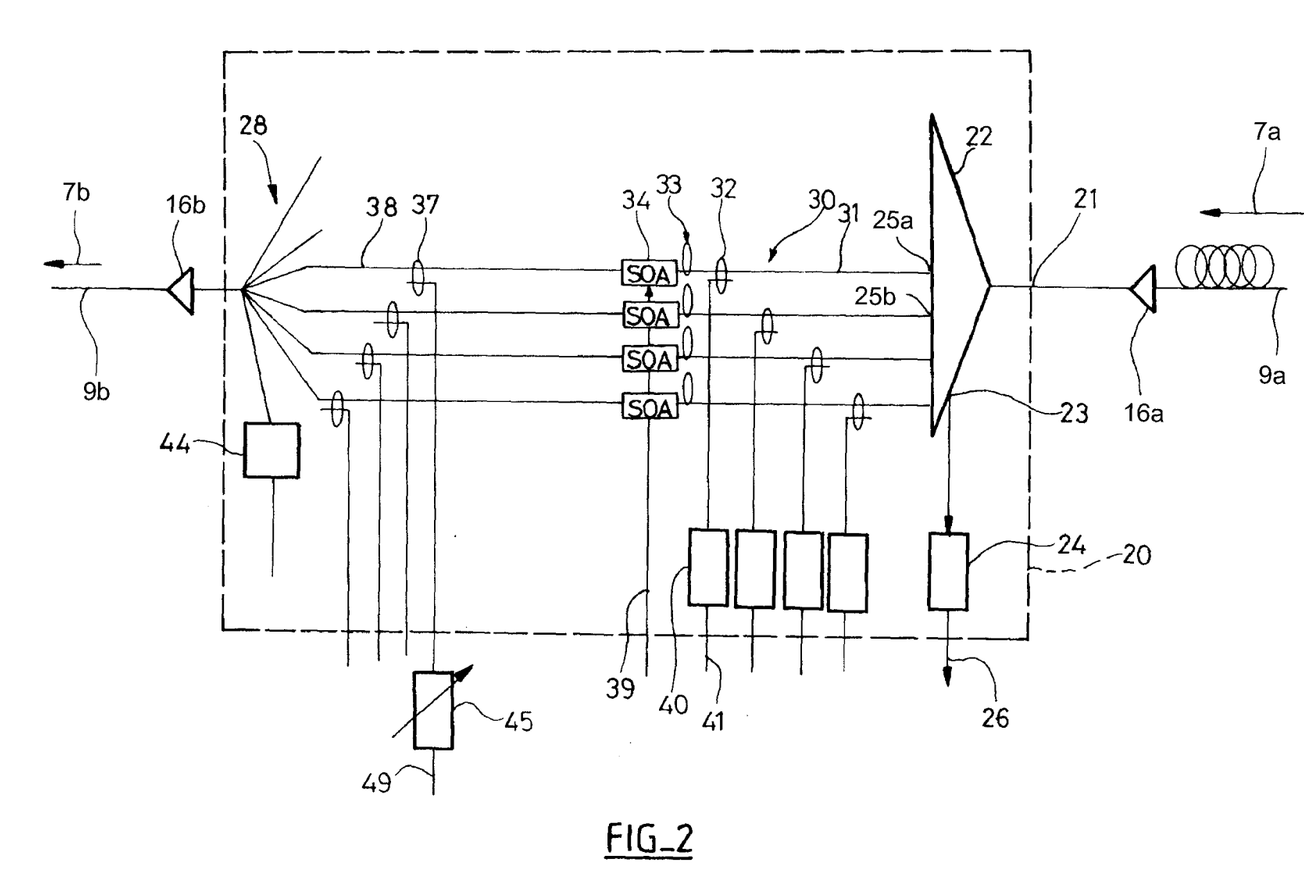
FIG. 2 is a functional depiction of the optical architecture of a node of the network in FIG. 1.

With reference to FIG. 2, an optical network is described that is suitable for access nodes 1 to 6. The network is preferably designed so that any access node can communicate with all the others in the optical field, which is to say that the network can transparently transport a data packet from the transmitter node to the receiver node. To do so, the nodes have a transparent transit section. Preferably, an access node is able to extract data packets on several wavelength channels. The bandwidth used for traffic destined for this node may then be allocated flexibly within a wide range as needed. Preferably, an access node is able to insert data packets on several wavelength channels. The transmitter node might thereby select a wavelength channel on which it will transmit depending upon the load on the channels. FIG. 2 depicts an optical layer 20 of the node 1, in the form of an optical packet add-drop multiplexer, able to meet these constraints.

At one input 21, the WDM optical signal transported by the optical fibre 9 is received and introduced into a demultiplexer 22. The demultiplexer 22 has several outputs separately supplying all the wavelength channels, including one channel reserved for signalling on output 23 and (N−1) data transport channels on the outputs 25. Output 23 is linked to an optical packet receiver 24 to demodulate the signalling information. A link 26 transmits the signalling information to a node controller 50, depicted in FIG. 3.

Each output 25 from the demultiplexer 22 is linked by an optical transit path 30 to an N:1 star coupler 28. The optical path 30 comprises successively an optical link 31, a 1:2 coupler 32 for extraction, a semiconductor amplifier 34 serving as a fast optical gate, a 2:1 coupler 32 for insertion and an optical link 38. The amplifier 34 is controlled by the node controller 50 through a link 39 to selectively block or open access to each data packet carried by the wavelength channel allocated to the optical path 30. A delay line 33—for example, a length of optical fibre—may also be envisioned for the optical path 30 to adjust the packet transit time across the node.

The extraction section here is composed, for each optical path 30, of an optical packet receiver 40 receiving the packets carried by the corresponding wavelength channel from the coupler 32. The wavelength channel allocated to the optical path 30 is therefore distributed across the transit section and the extraction section by the coupler 32. Each optical packet receiver 40 demodulates the optical packets under the control of the node controller 50 and transmits the demodulated data by a link 41 to an electronic switch 42, depicted in FIG. 3. An optical packet receiver 40 (also known as a "burst mode receiver") is able to demodulate the optical data packets by adapting to the signal level of each packet, which may vary depending upon the origin of the optical packet and the distance it travelled over the network. The packet receivers 40 also carry out clock recovery.

The insertion section of the node here comprises one or more optical packet transmitters 45 coupled with optical paths 30 by the couplers 37.

Preferably, the optical packet transmitter or transmitters 45 use a tunable optical source with an internal or external modulator, which makes it possible to reach the entire spectrum of wavelength channels for inserting traffic independently of the number of transmitters used. The optical packet transmitter 45 is connected by a link 49 to the node controller 50. Tuning the transmitter 45 is carried out under the control of the node controller 50 in synchronisation with the time windows available on the optical paths 30 for packet transmission. Preferably, the source must authorise fast tuning in relation to the packet time. For example, current technologies enable tuning in 50 or 100 ns.

The optical combiner 28 recombines the optical packets coming from the transit section and the insertion section and carried by the various wavelength channels, as well as the signalling packets inserted by an optical transmitter 44 on the dedicated signalling channel, and sends the resulting spectrally multiplexed optical signal over the optical fibre 9 to the next access node downstream.

At the input and output of the optical layer 20, an EDFA optical amplifier 16 is depicted, mounted on the optical fibre 9 to amplify the optical signal transported over the fibre. These amplifiers 16 improve the cascadability of the node by compensating for losses incurred by the optical components, especially the demultiplexer 22, the couplers 32 and 37, and the combiner 28. The number of amplification steps may be adapted to existing needs in the network, which depends upon the propagation distances and the set of optical devices installed. Additionally, as the optical gate 34 may fulfil an amplification function for packets in transit, an amplifier 16 is not always necessary. The architecture in FIG. 2 makes it possible to balance the losses among the various optical transit paths.

Figure 3:
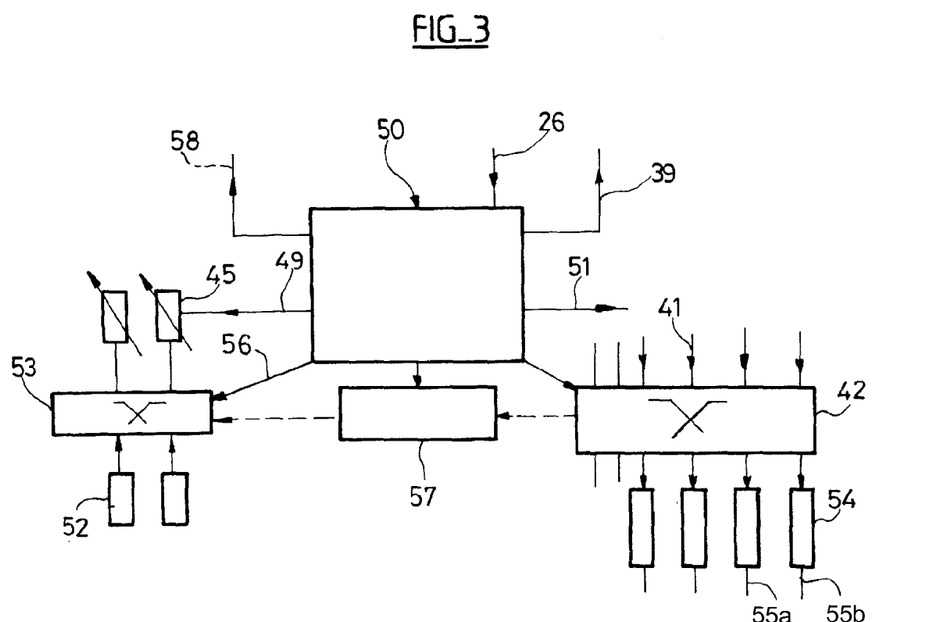
FIG. 3 is a functional depiction of the electronic architecture of the node in FIG. 2.

With reference to FIG. 3, the electronic layer of the access node and its operation are now described. The node controller 50 receives the signalling information about the data packets arriving over the input optical fibre 9 before these packets, so as to have the time to process this information and configure the packet receiver or receivers 40, the optical gate or gates 34, and the optical transmitter or transmitters 45 in synchronisation with the arrival of the packets. The signalling information about an optical packet includes, for example, the identification of the wavelength channel carrying it, the identification of the destination access nodes, the priority level of the packet, and synchronisation information about the time of arrival of the packet at the node.

The node controller 50 has a link 51 with the packet receivers 40. When the destination for a packet includes the access node in question, the node controller 50 commands the packet receiver 40 assigned to the corresponding wavelength channel to demodulate the packet, which is to say to convert the data to electronic signals and send them to the electronic switch 41. Therefore, it is possible to only demodulate the optical packets destined for the access node in question, which preserves the confidentiality of the traffic in transit. An alternative consists of demodulating all incoming packets in the extraction section and erasing the data not intended for this destination.

The electronic switch 41 temporarily stores the extracted data to manage competition for the output ports 55, reorder the packets, and transfer the packets to the output interfaces 54. An output interface 54 is an electronic module that formats the data in a manner adapted to the client layer connected to the output port 55. For example, the output interfaces 54 are Ethernet line cards, for example with a 10 Gbit/s or other capacity. The extraction capacity of the node may be modified in modular fashion by adding or removing an output interface 54 and/or by adding or removing a packet receiver 40. According to one specific form, a packet receiver 40 and an output interface 54 with suitable capacity are laid out in the form of a single module, for example an optoelectronic card.

The optical gates 34 are controlled by the node controller 50 so as to present a blocking state by default. The node controller 50 switches an optical gate 34 to the pass-through state only to allow traffic in transit to subsequent nodes to pass. Therefore, when a packet received at the input 21 has a destination downstream of the access node, the node controller 50 commands the optical gate 34 allocated to the corresponding wavelength channel to allow the packet to pass. During this time window, the wavelength channel is therefore occupied and unavailable for the insertion of traffic. Similarly, multipoint traffic or that distributed to all nodes is typically passed transparently through the optical gate 34, which may also be used to amplify the packet signal.

Figure 4:
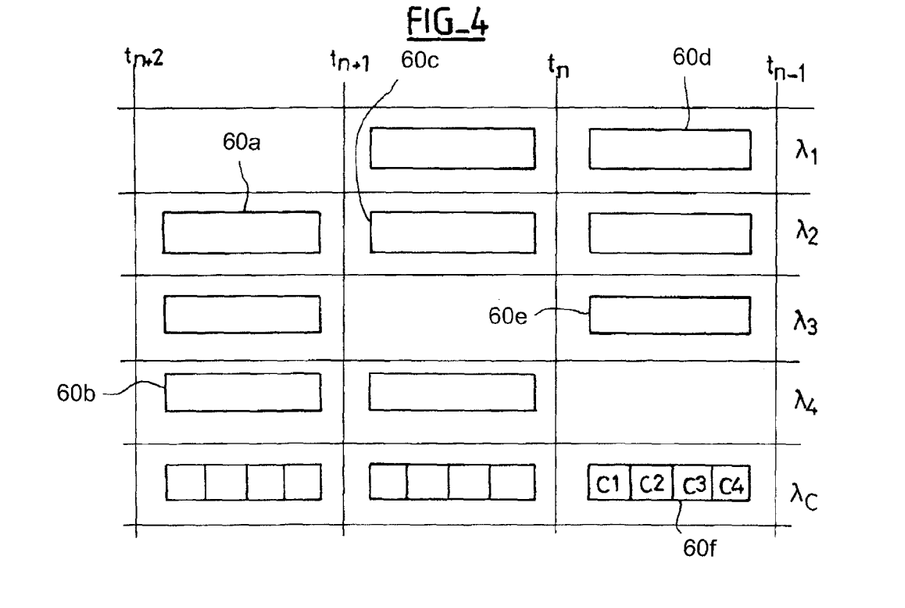
FIG. 4 is a functional depiction of the format of an optical signal received by the node in FIG. 2.

When a time window does not contain any packets on a given wavelength channel, for example $\lambda_3$ in the window $[t_n, t_{n+1}]$ in FIG. 4, the optical gate 34 corresponding to this wavelength channel remains the blocking state. This arrangement makes it possible to limit the propagation of optical background noise that may exist in this part of the spectrum and in this time window, due, for example, to active optical components along the line upstream of the node or in the node, especially EDFA amplifiers.

The insertion section comprises a temporary storage unit 53 for the data to be inserted. The unit 53 receives the data to be inserted from the client layer via the input interfaces 52, sends the data to queues according to their destinations and priority levels to form packets with a size suited to the format used in the optical network 10, and transfers these data to the packet transmitters 45 when their insertion has been determined by the node controller 50. The node controller 50 has a link 56 to the temporary storage unit 53 to continuously know the properties of the traffic to be inserted, such as for example the load status of the various queues. If a packet is awaiting insertion, the node controller 50 commands its insertion into an available time window on a wavelength channel that the destination node is able to extract. To do so, an assignment table for the wavelength channels to the various access nodes on the network may be determined centrally and sent to all nodes, for example by a network management system. Proper distribution of the wavelength channels among the nodes and optimal use of the tunable transmitters 45 should enable balancing of the traffic among the various channels. Alternatively, it may be possible to give all nodes the ability to extract packets on all channels, in which case, an assignment table is not necessary.

The available windows are known, either according to signalling and depending upon the decisions taken to erase packets in transit, or by the physical detection of the absence of traffic on a given channel (CSMA/CA method). Where applicable, detection of the signal to identify available windows can be carried out upstream of the delay lines 33.

The node controller 50 is also in charge of managing competition between packets in transit and inserted packets. For example, several methods may be implemented:

If a packet in transit has a higher priority level than a packet awaiting insertion on the same wavelength channel, the node controller allows the packet in transit to pass and defers insertion of the packet to be inserted.

If a packet in transit has a lower priority level than a packet awaiting insertion on the same wavelength channel, the node controller blocks the packet in transit with the optical gate 34 and inserts the packet to be inserted into the time window thus released. For the low priority packet that it erased, the node controller 50 can allow the retransmission mechanisms at the transmitter node operate without carrying out any specific action.

If a packet in transit and a packet awaiting insertion on the same wavelength channel both have a high priority level, corresponding for example to a guaranteed latency incompatible with end-to-end retransmission, the node controller commands the execution of the following steps: demodulation of the optical packet in transit in the extraction section and, simultaneously, the erasure of the optical packet in transit in the transit section, insertion of the packet to be inserted into the time window thus released, storage of the demodulated data in transit in a temporary storage unit 57, then insertion of these data into an optical packet in a later time window on a wavelength channel compatible with their destination. This processing has the disadvantage of changing the data in transit into electronic form, but such an event should be fairly rare if the network is not overloaded and if its load is well distributed across the wavelength channels. This processing also makes it possible to carry out a wavelength conversion for the packet in transit. This processing consisting of giving priority to the packet to be inserted and deferring transmission of the packet in transit may also be used, independently of the priority levels, if the queues for the storage unit 53 reach a high level of saturation.

The insertion capacity of the node may be modified in modular fashion by adding or removing an input interface 52 and/or by adding or removing a packet transmitter 45. According to one specific form, a packet transmitter 45 and an input interface 52 with adapted capacity are laid out in the form of a single module, for example an optoelectronic card.

Depending upon the decisions taken concerning packets in transit and packets inserted, the node controller 50 generates signalling information about the data packets exiting on the output optical fibre 9, and it commands the transmitter 44 with a link 58 to transmit the signalling information to the next hop ahead of the packets themselves.

The optical data packets may have various formats, with a fixed or variable size. According to one form, the network 10 is designed to be able to transport data packets with several modulation formats (for example OOK, BPSK, DQPSK, and others) and/or several modulation rates (for example 10 Gb/s, 40 Gb/s, 100 Gb/s, and others). In this case, the signalling for a packet preferably comprises information about the modulation format and/or rate, so that the switching decisions for the optical packet can be taken by the node controllers in consideration of the properties of the packet, for example to direct the packet to a suitable optical receiver at the destination node for the packet.

Preferably, fixed-size time windows are used in roughly synchronous fashion on all wavelength channels, which simplifies synchronisation among access nodes and reduces the quantity of information that must be exchanged to carry out this synchronisation. In fact, in the case of synchronous transmission over all the wavelength channels, the nodes must simply recognize the start of the transmission window. FIG. 4 illustrates the synchronous transmission of fixed packets on all channels. The columns depict successive time windows of the same duration. The data are inserted into the network 10 in the form of at most one optical packet 60 per time window and per wavelength channel. Four wavelength channels $\lambda 1$ to $\lambda 4$ are depicted, along with a signalling channel $\lambda c$. A line depicts the traffic passing on a wavelength channel at a given point on the network 10 over the time between the point $t_{n-1}$ and the point $t_{n+2}$. FIG. 4 depicts, by way of example, a format that can be used to transmit signalling information in this framework. The packet 60 on the signalling channel comprises four fields C1 to C4 respectively containing the signalling information for four data channels. On the signalling channel, a time window contains the signalling information for the packets present in the next time window, so that the nodes always receive the signalling information ahead of the data. If this advance is a fixed number of time windows, it is not necessary to insert explicit synchronisation information into the signalling data, as a node recognises the relationship between signalling packets and data packets according to the time windows in which it receives the packets. For example, the duration of the time window may be about 1 to 100 microseconds, advantageously close to 10 microseconds. FIG. 4 also shows that, in the packet network 10, an optical signal is only present on a wavelength channel when there is a data packet to be transmitted, as opposed to circuit type technologies such as SONET/SDH.

Figure 5:
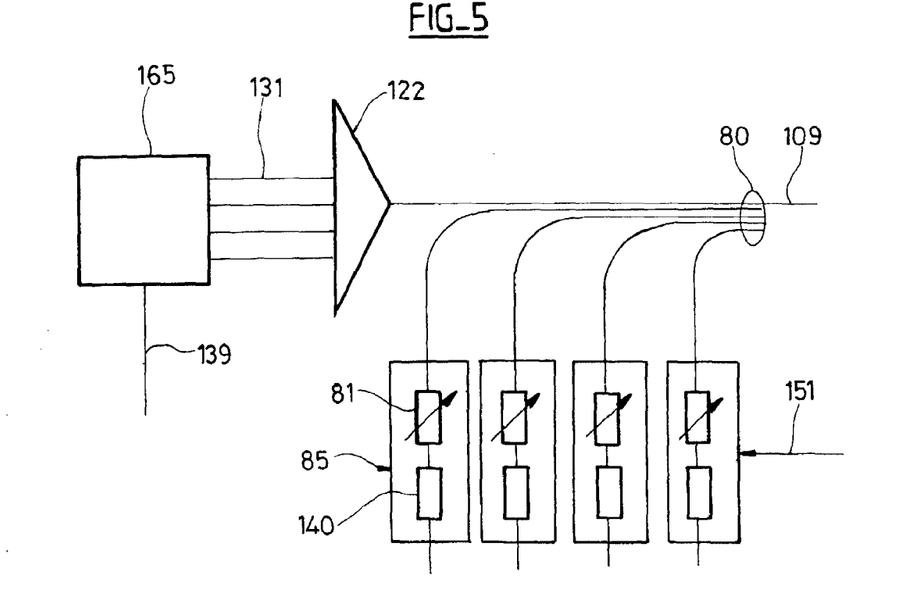
FIG. 5 is a functional depiction of an extraction section of the node in FIG. 2 according to an alternative form.

In FIG. 2, an optical packet receiver 40 is assigned to a wavelength channel, which links the extraction capacity of the node to the number of channels upon which it can receive packets. By using one or more fast tunable receivers, it is possible to adjust the spectral band able to be used to send packets to the access node and the extraction capacity of the node independently of each other. FIG. 5 depicts a variant form of the extraction section of a node according to this principle. Elements identical or similar to those in FIG. 2 bear the same reference number, increased by 100. The input optical fibre 109 is connected here to a 1:5 star coupler 80 in the example depicted, whose output branches are respectively connected to the demultiplexer 122 for the transit section of the node and to one or more fast tunable optical packet receivers 85 forming the extraction section of the node. A tunable receiver 85 is for example comprised of a tunable filter 81 and a packet receiver 140. In this case the connection 151 between the node controller and the tunable receivers 85 makes it possible to command the filter 81 according to the signalling information to tune the filter 81 on the wavelength channel corresponding to a packet to be demodulated. The extraction capacity of the node may be modified in modular fashion by adding or removing tunable receivers 85. Using tunable receivers 85 makes avoids the need for centralised assignment of wavelength channels to the access nodes. The block 165 depicts the other components of the node, which are embodied similarly to FIG. 2.

There are other possibilities for embodying an extraction section. For example, in the case of an internal extraction section as in FIG. 2, a 4×4 coupler (or P×Q, P and Q being positive whole numbers) may be designed to combine the signals taken from each optical path and to redistribute the combined signal to several packet mode receivers equipped with fixed or tunable filters. In another variant based on FIG. 5, the coupler 80 is replaced by a 1×2 coupler where one output leads to the extraction section. The extraction section may be embodied each time with a beam splitter and several tunable receivers, or else with a demultiplexer and several selectable coloured receivers. A selectable coloured receiver is comprised of a wavelength receiver combined with an optical gate. Fixed or tunable coherent wavelength optical receivers can also be used, in which case an optical filter is not necessary.

Figure 6:
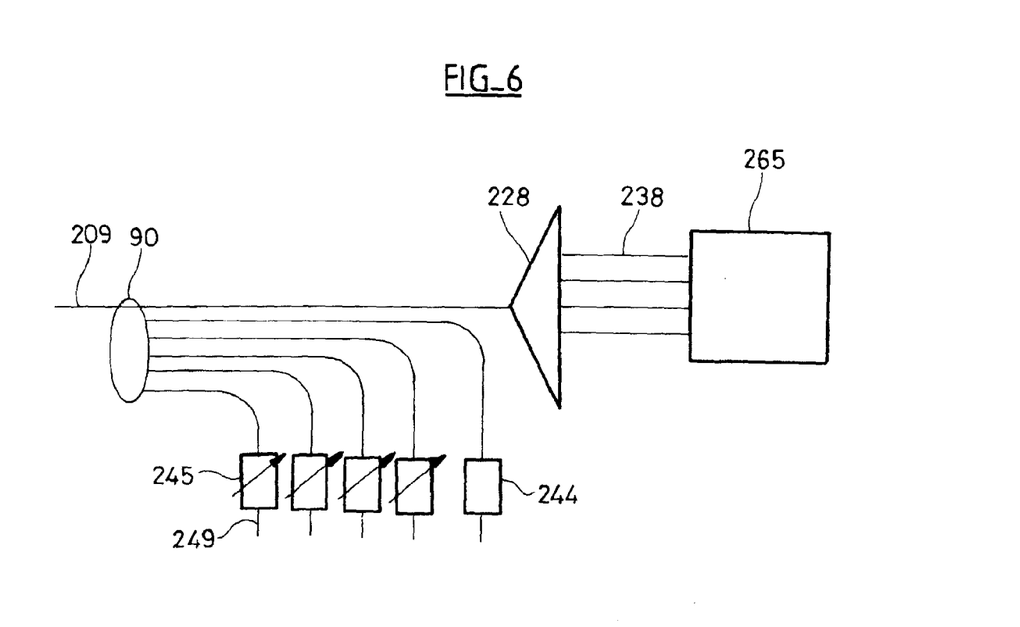
FIG. 6 is a functional depiction of an insertion section of the node in FIG. 2 according to an alternative form.

FIG. 6 depicts a variant form of the insertion section of a node. Elements identical or similar to those in FIG. 2 bear the same reference number, increased by 200. The optical packet transmitters 244 and 245 are connected here to a 6:1 type star coupler 90 in the example depicted, which combines the packets inserted by the transmitters with the packets that passed through the transit section. The output of the coupler 90 is connected to the output optical fibre 209. The optical combiner 228 therefore only receives packets in transit. The combiner 228 can then be embodied in the form of a multiplexer as the optical lines 238 carry predefined wavelength channels, which makes it possible to reduce losses and potentially to save an optical amplification step. Here also, the insertion capacity of the node may be modified in modular fashion by adding or removing fixed or tunable transmitters 245. The block 265 depicts other components of the node, which are embodied similarly to FIG. 2.

In another variant form, the insertion section is embodied with an array of fixed coloured transmitters, optionally an array of optical gates positioned at the transmitter outputs, and a multiplexer to combine the coloured signals from the transmitters. A 2×1 coupler is positioned in place of the coupler 90 to combine the output from the insertion section with the output from the optical combiner 228.

Advantageously, the optical components of the extraction, transit, and insertion sections are protected by redundant components according to a 1 for n protection scheme, where n designates a number greater than 1. Protection components are designed for example for the fixed 40 or tunable 85 packet receivers, the packet transmitters 24 or 245, and the optical paths 30. To protect against errors, for example power or node controller failures, a means to switch the optical gates 34 into the pass-through state should be planned in response to such a situation. Therefore, the rest of the network will not be affected by the failure.

To improve the cascadability of the node, optical amplifiers, SOA for example, may be envisioned at several points on the node, especially at points where the optical signal suffers attenuation, such as at the couplers. An amplifier may for example be incorporated into a coupler.

The optical network 10 is preferably managed using a combination of centralised and distributed processes. The centralised processes, implemented for example by using a centralised management system, concern for example the assignment of wavelength channels to the nodes that can extract them and the definition of priority levels or service classes. The distributed processes concern for example the management of insertion, transit, and extraction by the access nodes with packet level granularity.

Some of the elements depicted, particularly the node controller 50, may be constructed in various forms, in a stand-alone or distributed fashion, using hardware and/or software components. Hardware components that may be used are application-specific integrated circuits, field-programmable gate arrays, or microprocessors. Software components may be written in various programming languages, such as C, C++, Java, or VHDL. This list is not exhaustive. Similarly, the queues necessary for temporarily storing the extracted data and the data awaiting insertion can be centralised in a memory module or distributed among several.

A network management system may be a hardware device, such as a microcomputer, a workstation, a device connected to the Internet, or any other dedicated or general-purpose communication device. Software programs run by this system fulfil network management functions for controlling network elements.

The nodes described above can be used in many types of optical networks, with ring or other architectures, with any number of nodes, and with wide-ranging geographic scopes, particularly, LAN, MAN, WAN, and others. In particular, the nodes comprising optical gates able to erase traffic in transit on the optical transit paths 30 can be used in combination with other types of nodes that have entirely transparent optical transit paths. Entirely transparent optical transit path designates the function by which the input port of a node transparently passes all incoming packets to one or more output ports on the node.

Examples of nodes with entirely transparent optical transit paths are, in particular, the DBORN nodes described in the publications "DBORN: a shared WDM Ethernet Bus architecture for optical packet metropolitan networks", No. Le Sauze et al., Paper TuC3, Photonic In Switching, Cheju Island, Korea, 2002 et "Physical assessment of a cost-effective passive optical packet ring at 2.5 Gbit/s", T. Zami et al., Paper Ps.Th.B2, Photonic In Switching, 2003. These nodes insert packets into the optical transit path using a CSMA/CA media access control protocol based on the detection of empty time windows. In other words, the node monitors the incoming wavelength channels using photodiodes that sample the traffic in transit to detect empty time windows into which packets can be inserted.

In a network comprising both nodes equipped with optical gates able to erase the traffic in transit on the optical transit paths and nodes with entirely transparent optical transit paths, directing the optical gates to a blocking state by default makes it possible to limit the wide band optical noise accumulated in empty time windows, and thus to improve the signal to noise ratio of the optical packets inserted by the nodes with entirely transparent optical transit paths. In other words, the optical gate of an optical transit path of a node can be used to clean the corresponding wavelength channel(s), even when the node does not have any packets to insert and even at times when no optical packets are present on the channel or channels, so as to improve the noise conditions for the insertion of traffic by a DBORN or similar node located downstream.

Figure 7:
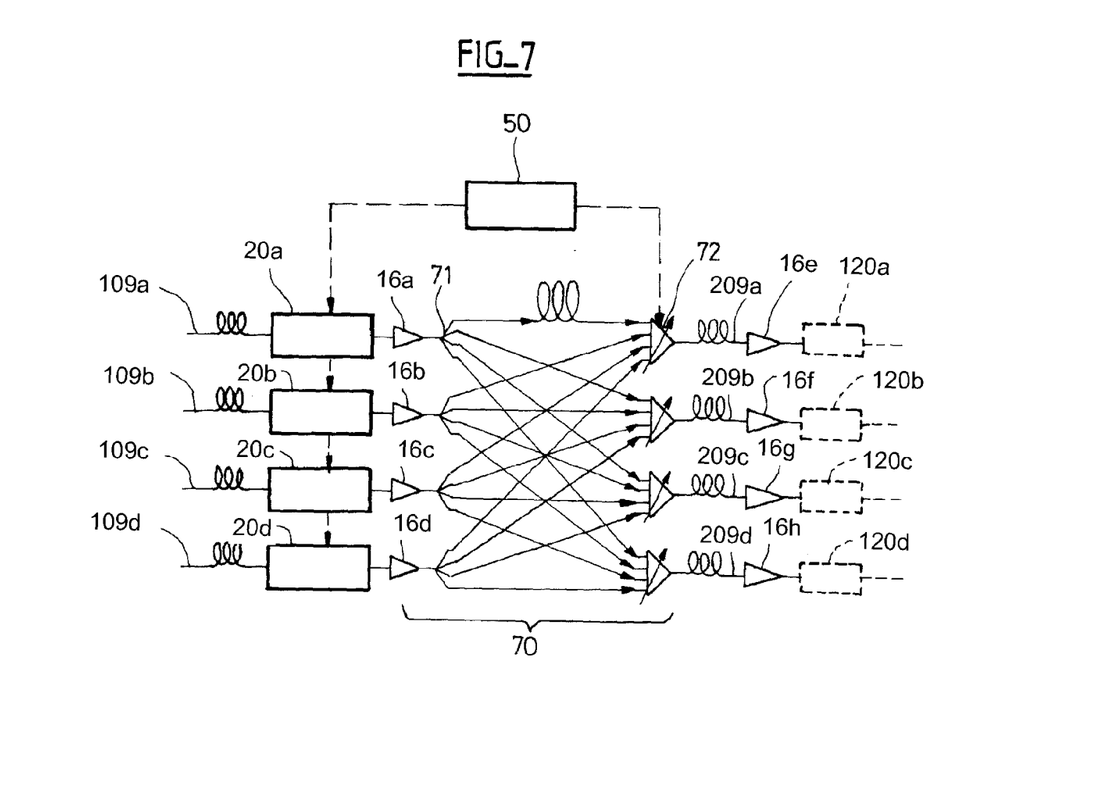
FIG. 7 depicts the optical architecture of a communication node according to another form of the invention.

With reference to FIG. 7, another optical node architecture is described that is suitable for example for creating a meshed topology. Elements identical or analogous to the ones in FIGS. 2 and 3 have the same reference numbers. In particular, the number 20 designates the optical packet add-drop multiplexer described above, the signal propagation direction being however reversed between FIG. 2 and FIG. 7. The node in FIG. 7 comprises a wavelength channel switching matrix 70, here with four inputs and four outputs, created from beam splitters 71 and wavelength selection switches 72 in a broadcast and select architecture. An optical packet add-drop multiplexer 20 is positioned on each input line 109. Alternatively, as indicated at number 120, an optical packet add-drop multiplexer may be mounted on each output line 209. The node controller may be laid out to simultaneously command the optical packet add-drop multiplexers 20 and the wavelength selection switches 72 in an integrated manner.

Although the invention has been described in connection with multiple specific forms, it is naturally not in any way limited to them, and comprises all technical equivalents of the means described, as well as their combinations, if said combinations fall within the scope of the invention.

The use of the verbs "comprise" or "include" and their conjugated forms does not exclude the presence of elements or steps other than those set forth in a claim. The use of the indefinite articles "a" or "an" for an element or step does not, unless otherwise stated, exclude the presence of a plurality of such elements or steps. Multiple means or modules may be depicted by a single hardware element.

In the claims, any reference sign within parentheses should not be interpreted as limiting the claim.

The invention claimed is:

1. An optical signal switching device, comprising:
An input section able to receive an optical signal comprising data packets carried by wavelength channels,
An output section able to transmit an optical signal comprising data packets carried by wavelength channels,
An extraction section able to demodulate data packets carried by at least one of the wavelength channels received in the input section,
An insertion section able to generate optical data packets on at least one wavelength channel to be transmitted by the output section,
A spectral separator to separate several of said wavelength channels received by the input section,
An optical combiner to recombine the wavelength channels separated by said spectral separator,
A transit section comprising optical paths to transparently pass the respective wavelength channels between the spectral separator and the optical combiner,
Several selector elements each cooperating with a respective optical path and able to be switched in packet mode to selectively block or allow an individual data packet carried by the wavelength channel using said optical path to pass, and
A control unit capable of receiving signalling information about the data packets received in the input section and defining, for a data packet, a wavelength channel and a time window that contains said data packet, and controlling a selector element corresponding to said wavelength channel synchronously with said time window to block or allow said data packet to pass, said control unit maintaining the selector element in a blocking state during the time windows in which no data packets are received on said wavelength channel.

2. Switching device according to claim 1 in which said signalling information concerning a data packet defines a destination for said data packet.

3. Switching device according to claim 2, in which said control unit is able to switch the selector element to a pass-through state during a time window containing a data packet with a destination downstream of said communication to allow the data packet to pass on to said output section.

4. Switching device according to claim 1, in which the insertion section comprises at least one optical transmitter able to generate data packets on said wavelength channel.

5. Switching device according to claim 4 in which the control unit is able to receive information about the data awaiting insertion and to control said optical transmitter for the insertion section to generate, on said wavelength channel, optical packets containing said data awaiting insertion synchronously with the time windows in which the selector element is in the blocking state.

6. Switching device according to claim 1, characterised by the fact that said selector element comprises a semiconductor optical amplifier laid out as an optical gate on an optical path in the transit section.

7. Switching device according to claim 1, characterised by the fact that the signalling information about the data packets received in the input section are carried by a predetermined wavelength channel (c) of said optical signal, said node comprising a spectral separator to separate said predetermined channel and an optical receiver to demodulate said signalling information.

8. A communication node for a WDM optical network comprising:
Several input lines to receive the incoming WDM optical signals,
Several output lines to transmit the outgoing WDM optical signals, A switching device according to claim 1 interposed on each of said input or output lines, and A wavelength switching device linking said input lines with said output lines and able to form said outgoing WDM optical signals and recombining the wavelength channels coming from said incoming WDM optical signals each time.

9. A transparent or hybrid optical network comprising several network components selected from the group consisting of the switching devices according to claim 1 and communication nodes according to claim 8, and optical fibers linking said network components.

10. An optical network according to claim 9, over which data packets with various modulation formats and/or various modulation rates are transmitted.

11. Optical network according to claim 9, also comprising at least one entirely transparent optical transit path node connected to at least one of said network components by optical fibers.

* * * * *